United States Patent [19]

Palmquist et al.

[11] Patent Number: 4,611,331
[45] Date of Patent: Sep. 9, 1986

[54] GLASS MELTING FURNACE

[75] Inventors: Ronald W. Palmquist, Horseheads; Robert R. Thomas, Watkins Glen, both of N.Y.

[73] Assignee: Corning Glass Works, Corning, N.Y.

[21] Appl. No.: 729,626

[22] Filed: May 2, 1985

[51] Int. Cl.[4] ............................................. C03B 5/027
[52] U.S. Cl. ....................................................... 373/30
[58] Field of Search ....................... 373/30, 31, 32, 27, 373/41, 137

[56] References Cited

U.S. PATENT DOCUMENTS

| | | |
|---|---|---|
| 2,263,848 | 11/1941 | Keany ................................ 373/30 X |
| 2,777,254 | 10/1952 | Siefert et al. |
| 3,109,045 | 3/1958 | Silverman . |
| 4,366,571 | 6/1984 | Palmquist . |

FOREIGN PATENT DOCUMENTS 1230177 12/1966 Fed. Rep. of Germany .
 601851  6/1948 United Kingdom .

*Primary Examiner*—Roy N. Envall, Jr.
*Attorney, Agent, or Firm*—B. R. Turner

[57] ABSTRACT

A glass melting furnace is disclosed having a refractory melting vessel provided with a protective liner formed of an oxidizable refractory metal such as molybdenum, wherein the liner projects upwardly within a molten bath contained within the vessel and through its fusion line into a batch blanket retained thereabove which is low in carbonates. The upper end of the liner is provided with a seal to prevent the flow of batch material between the liner and the refractory vessel and thereby prevent contamination of material behind the liner and reduce corrosion of the refractory vessel.

23 Claims, 8 Drawing Figures

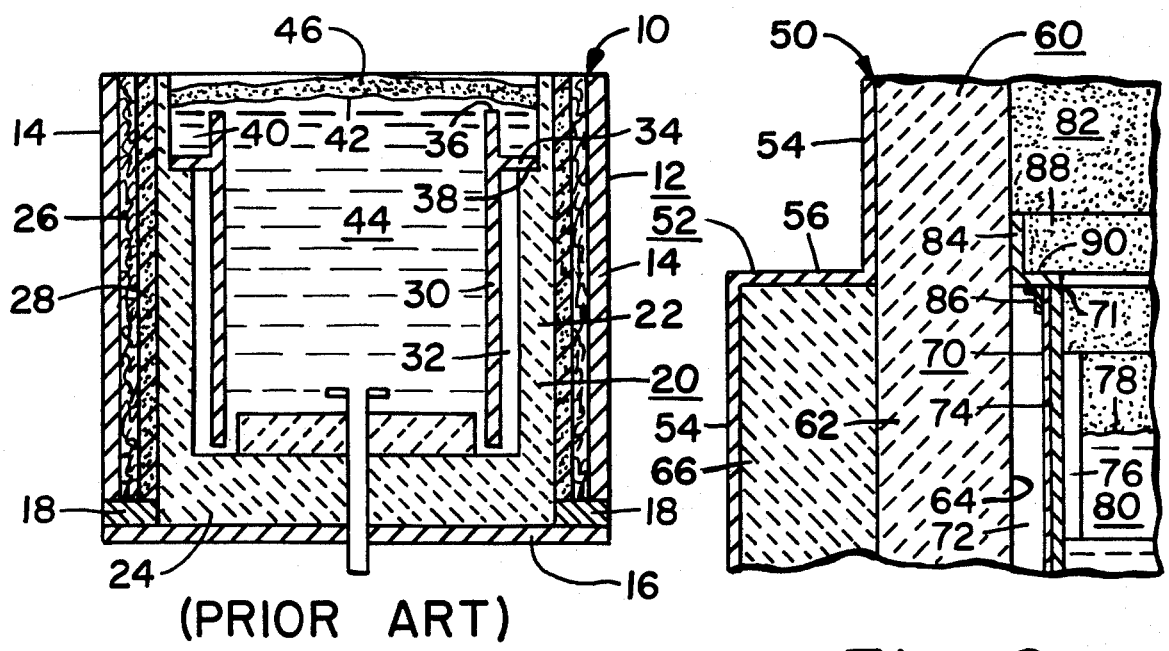
Fig. 1 (PRIOR ART)
Fig. 2
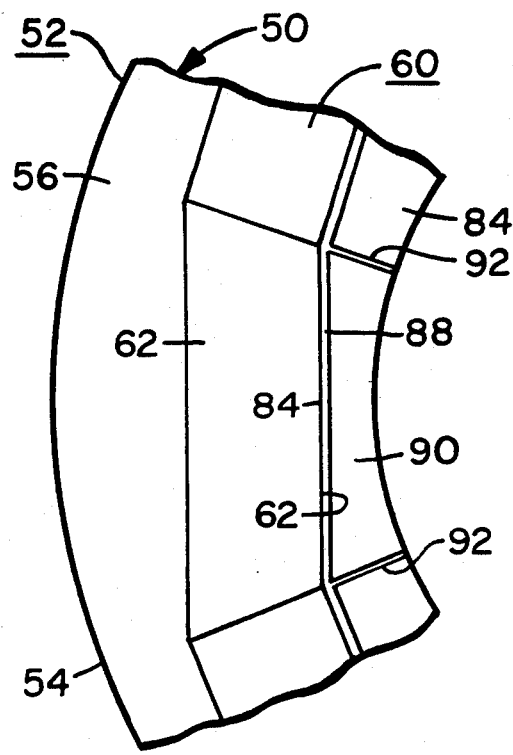
Fig. 3
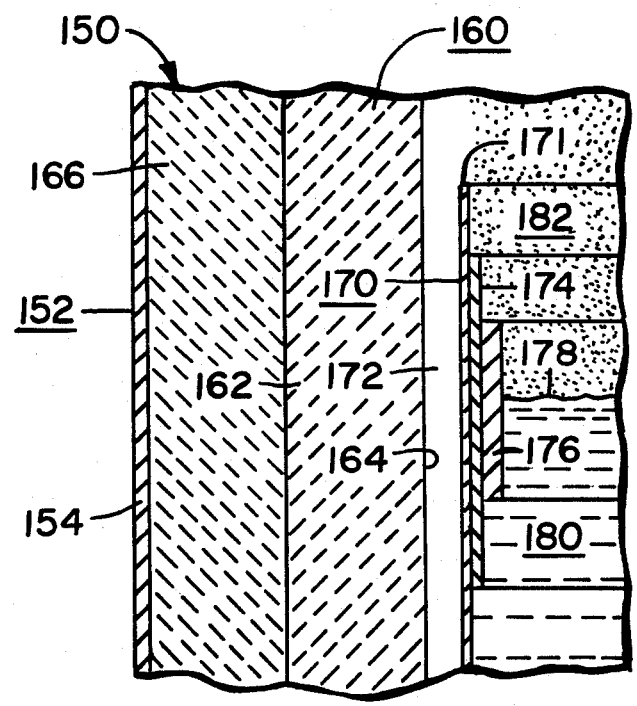
Fig. 4

1

GLASS MELTING FURNACE

BACKGROUND OF THE INVENTION

This invention relates to furnaces for melting thermoplastic materials such as glass, and more particularly to those furnaces having a protective liner within the melting chamber of the furnace for protecting the sidewalls and/or the bottom walls of the melting chamber from the corrosive action of the melt. As pointed out in U.S. Pat. No. 4,366,571, which is a basic patent relating to the use of a protective liner in a melting furnace, the use of a refractory metal liner protects the refractory sidewalls and bottom of the melting chamber from the corrosive action of the molten bath contained therein. However, since the liner was preferably formed from an oxidizable refractory metal, in order to protect the liner from oxidation, it was immersed in the molten bath during normal operations, with the upper end terminating below the fusion line.

FIG. 1 illustrates the prior art device such as shown in U.S. Pat. No. 4,366,571. As illustrated, the prior art furnace 10 included an outer shell 12 having sidewalls 14 and a bottom wall 16, which may be electrically insulated by insulating shims 18. A refractory vessel 20, having upstanding sidewalls 22 and a bottom wall 24, and which may be formed from a plurality of refractory blocks, is retained within the outer shell 12 and is preferrably provided with a plurality of layers of insulation 26, 28 between the sidewalls 22 of the vessel 20 and the sidewalls 14 of the outer shell 12. A liner 30 is positioned within the refractory vessel 20 in closely spaced-apart relationship with respect to the sidewalls 22 of the vessel so as to form a limited space 32 between the liner and such sidewalls. In addition, the liner 30 has an outwardly directed flange 34 formed below its upper margin 36, which flange associates with an outwardly stepped ledge 38 of refractory sidwall 22, forming an offset trap 40 behind the upper portion of the liner 30.

In view of the fact that the liner 30 is preferrably made of a refractory metal material which is oxidizable at elevated temperatures, such as molybdenum, it has been considered imperative to maintain the upper margin 36 of the liner below the glass line or fusion line 42, extending between the molten bath 44 within the vessel 40 and the batch material 46 supplied to the vessel. Further, the space 32 and the trap 40 are supplied with cullet or other suitable materials which become thermoplastic or semi-molten during the furnace operation, to not only encompass the outer portions of the liner to protect it from oxidation, but also provide substantially quiescent zones for protecting the refractory walls of the vessel 20 from corrosion.

In a like manner, U.S. Pat. No. 3,109,045 discloses the use of a refractory metal melting pot which is immersed in a bath of molten glass within a tank, such that the upper edge of the melting pot is below the level of the glass in order to protect it from oxidation. A refractory member seats upon the upper rim or top surface of the melting pot and provides a seal which prevents the entrance of the surrounding molten glass into the melting chamber.

U.S. Pat. No. 2,777,254 relates to a coated refractory for contacting molten glass, wherein each block of refractory is provided with a protective coating. That is, platinum foil is bonded by heat and pressure and alumina to refractory blocks, such as zirconium or the like, and such platinum-bonded refractory is utilized in glass contact portions of a molten glass tank. However, in view of the fact that the platinum is a precious metal and is not readily oxidizable, it may be positioned both within and without the molten bath.

United Kingdom Patent Specification No. 601,851 relates to electrically heated glass melting furnaces wherein the refractory walls of the furnace are lined with iron plates which extend through the glass line to the top of the furnace, where the batch charge protects the iron from oxidation. However, the iron plates extend only to the glass line in the working chamber of the furnace, where no protective batch blanket exists.

German Pat. No. 1,230,177 discloses the use of molybdenum baffles about the sidewalls of the furnace relatively close to, but below the melt line, so as to protect the molybdenum baffles from oxidation and the refractory sidewalls from the corrosive action of the glass adjacent the glass line.

As previously mentioned with respect to FIG. 1, the liner 30 was protected from corrosion by not only maintaining its upper extent 36 below the fusion line 42, but also by providing a radial flange 34 and an offset 38 so as to allow the glass within the trap 40 above the flange to cool enough so that it may contact the vertical refractory wall 22 without excessive corrosion of the wall. Further, it was deemed necessary to terminate the upper margin 36 of the liner 30 below the fusion line 42 so that the liner would not extend into and be corroded by the corrosive batch materials 46.

However, it has been discovered that many batch materials are not corrosive with respect to molybdenum and other refractory metals of which the liner may be formed. That is, it appears that the corrosion of molybdenum in the batch blanket is proportional to the amount of oxidizing gases produced by the melting batch materials. Hence, the proposed embodiments may be utilized with batch materials which produce small amounts of oxidizing gases. Such batch materials, which are not corrosive to molybdenum and the like, do not contain large amounts of carbon dioxide, or other materials which produce sufficient oxidizing gases to be detrimental to the molybdenum. Accordingly, when melting glasses such as borosilicates, the batch of which contains very few carbonates, the liner may be extended upwardly so as to be immersed in the batch blanket without suffering any deleterious corrosion effects. It is preferrable to provide the upper portion of the liner with an effective seal with the refractory wall so as to minimize the introduction of batch materials behind the liner. Such batch materials could create fresh glass between the liner and the refractory, especially during start-up operations of the furnace, which glass could contribute to the corrosion of the refractory behind the liner.

The present invention overcomes the problems encountered with known furnace liners by providing a liner which not only protects the refractory wall behind the liner in the molten bath from corrosion, but also functions to protect the refractory wall above the liner from corrosion. In addition, the upper portion of the liner is terminated above the fusion line without deleterious thermal or corrosive effects to the liner per se, and the upper portion of the liner is effectively sealed to the refractory vessel so as to minimize the formation of fresh glass behind the liner which would promote corrosion of the refractory.

SUMMARY OF THE INVENTION

In its simplest form, the present invention relates to the use of a protective liner of corrosion resistant material within the refractory vessel of a furnace for melting thermoplastic materials, such as glass, so as to protect the refractory vessel from the corrosive effects of the molten bath therewithin, wherein the protective liner projects above the fusion line of the molten bath to protect the refractory walls both above and below the fusion line from corrosion. Further, the liner may be effectively sealed at its upper end to wall portions of the refractory vessel so as to inhibit the addition of new materials behind the liner, which would have a tendency to corrode such wall portions.

BRIEF DESCRIPTION OF THE DRAWINGS

FIG. 1 is a somewhat schematic elevational view in section of a furnace incorporating a prior art protective liner.

FIG. 2 is a fragmental schematic side elevational view in section of an upper portion of a protective liner embodying the present invention, positioned within a melting furnace.

FIG. 3 is a fragmental top plan view of the embodiment shown in FIG. 2.

FIGS. 4, 5, 6, 7, and 8 are fragmental schematic elevational views in section of the upper portion of various protective liners, embodying the present invention, positioned within a melting furnace.

DESCRIPTION OF THE PREFERRED EMBODIMENT

Figure 5:
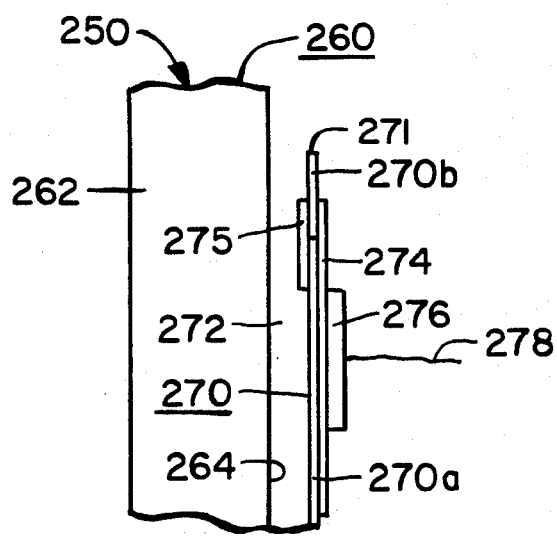

Referring now to the drawings, and particularly FIGS. 2 and 3 which set forth a preferred embodiment, a furnace 50 has an outer shell 52 including sidewalls 54, and a bottom wall (not shown). A refractory vessel 60, of suitable glass contact refractory, has upstanding sidewalls 62 and a bottom wall (not shown), which may be similar to bottom wall 24.

A protective liner 70, of any suitable material such as molybdenum or other oxidizable refractory metal, is shown positioned within the vessel 60 and spaced-apart from the inner surface 64 of upstanding sidewalls 62 so as to form a limited cavity or space 72 between the liner 70 and the vessel 60. The liner may be provided with an extended backing or wear plate 74 adjacent its upper end and a wear plate 76 adjacent the fusion line 78, which plates may be formed of the same material as the liner 70. The fusion line 78 extends between the molten bath 80 and the batch material 82, which is retained thereon within the vessel 60.

As shown in FIG. 3, the refractory vessel 60 may be formed in the shape of a multi-sided polygon having a plurality of upstanding walls 62, whereas the protective liner 70 may be of a cylindrical form. Accordingly, a series of L-shaped plates 84 are positioned adjacent the top of the liner 70 to provide a seal between the liner and the refractory wall 62 so as to minimize the circulation of material within the space 72 from the interior of the vessel 60. The plates 84 may be supported by suitable brackets 86 attached to the liner 70.

As shown in FIGS. 2 and 3, the upright portion 88 of the plates 84 fits against the inner surface 64 of the refractory wall 62, whereas the horizontal portion 90 overlies or covers the space 72. A slight gap 92 may exist along radial lines between adjacent plates 84. However, due to the fact that the plates 84 are not unitarily connected together, the plates do not incur the relatively high circumferential stress, as would a solid cylindrical ring. As previously pointed out, the purpose of the plates 84 is to minimize the size of any passageway through which the molten bath or fresh batch may enter the space 72 behind the liner, rather than to entirely eliminate a passageway between the molten bath and the material behind the liner, however, gap 92 should be as small as possible.

As shown, the fusion line 78 is intended to operate well below the upper end 71 of the liner, and the molybdenum or other refractory metal liner extends well above the fusion line into the batch material 82. However, where the batch materials contain a relatively low amount of carbonates, such as used in forming borosilicate glasses, the molybdenum liner is not deleteriously affected by the batch materials. Further, whereas the temperature of the liner adjacent the fusion line may be about 1500° C., the temperature at the upper end 71 of the liner preferable may only be about 1200° C., or about 20% less than that adjacent the fusion line. The change in temperature ($\Delta t$) between that experienced by the liner in the molten bath adjacent the fusion line and that at the upper end of the liner, should preferably not be greater than about 25% of the temperature at the fusion line, since much larger $\Delta t$'s tend to generate stresses in the liner which may exceed the yield strength of the molybdenum and cause cracking or warping.

That is, some cracking of the molybdenum liner, due to stresses generated from severe temperature differences, may occur when the upper end of the liner projects sufficiently high within the batch material so that the temperature experienced by the upper end of the liner is decreased by more than about 45% of the temperature experienced by the liner in the molten bath adjacent the fusion line. For example, when the molten glass within the vessel 60 adjacent the fusion line 78 is about 1500° C. and the upper end 71 of the liner is terminated at a point so that it experiences a temperature of about 1200° C., the $\Delta t$ is not sufficient to generate stresses which exceed the yield strength of the molybdenum, however, when the upper end of the liner is terminated at a point wherein it experiences a temperature of about 800° C., the $\Delta t$ is sufficiently large so as to experience cracking to the molybdenum liner.

However, in view of the fact that the L-shaped seal plates 84 are separated from each other due to radial gaps 92, they are not subjected to the circumferential stress that a solid cylindrical ring would experience. Therefore, even though the upper extent of the seal plates may be at a temperature which is less than that which would be experienced with a desirable maximum $\Delta t$ of about 25% of the temperature experienced by the liner adjacent the fusion line, no deleterious results are exhibited in view of the fact that the plates 84 are separately formed and attached to the liner 70. Further, although warping may be a problem, where the entire molybdenum liner is elevated above about 1200° C., cracking of the liner should not be a problem even where the $\Delta t$ is greater than 25%, since at such temperatures, molybdenum is able to relieve itself of thermal stresses in one hour by a mechanism that is a combination of creep and recrystallization.

As is noted particulary in FIG. 2, the insulation 66, adjacent upstanding walls 62, terminates at about the upper end 71 of the liner 70 such that the outer shell 52 has a step or horizontal shelf portion 56 between the sidewall portions 54. Accordingly, cooling air from the outside of the furnace 50 functions to cool the upstanding sidewalls 62 of the vessel 60 above the top of the liner 70, thereby reducing the thermal corrosive affects of melting batch materials on the inner surface 64 above the liner.

As set forth in prior art U.S. Pat. No. 4,366,571, the cavity or space 72 between the liner and the refractory vessel may be filled with a suitable non-corrosive glass mixture so as to protect the external portion of the liner from oxidation and inhibit corrosion of the refractory vessel.

Referring now to FIG. 4, a furnace 150 is shown having an outer shell 152 with sidewall portions 154. A refractory vessel 160 having upstanding sidewalls 162 with an inner surface 164 is shown surrounded by insulation 166. A protective liner 170, having an upper end portion 171, is positioned within the vessel 160 in closely spaced relation thereto so as to provide a limited cavity or space 172 therebetween. The protective liner 170 may have wear plates 174 and 176 adjacent the fusion line 178, to protect the liner from the severe corrosive effects produced at the fusion line which is formed between the molten bath 180 and batch material 182.

Although the embodiment shown in FIG. 4 is not presently a preferred embodiment, it may be viable in those situations wherein the batch materials being melted contain a low amount of carbonates and are melted at relatively low temperatures or in relatively small tanks, such that the $\Delta t$ experienced by the liner 170 between a point in the molten bath 180, adjacent the fusion line and its upper end 171 is low enough so as to prevent the cracking or warping of the liner. It will be noted that the upper end 171 of the liner 170 projects substantially further into the batch material than does the upper end 71 of liner 70. Accordingly, the liner 170 necessarily experiences a much larger $\Delta t$ between the bath area and its upper end than does that of liner 70, and therefore is more prone to thermal cracking. However, in view of the fact that the liner 170 does project a substantial distance within the batch material, the liner tends to protect the inner surface portions 164 of the vessel 160 for a substantial distance above the fusion line 178, and accordingly the use of a stepped wall, such as 56, for cooling the upper sidewall portions 162 is not required. Further, it is desirable to fill the space 172 to the top with cullet, sand, and/or tamp in order to protect the refractory walls 162 by inhibiting the inflow of batch material, particularly in view of the fact that a mechanical upper seal may be omitted with the embodiment shown in FIG. 4. That is, if fresh batch material were allowed in space 172 which became molten, it would have a tendency to corrode refractory wall surfaces 164.

In order to alleviate the problem of thermal cracking of the liner, as a result of thermal stresses being generated within the liner which exceed the yield strength of the liner material, a split liner 270 may be employed within a refractory vessel 260, as shown in FIG. 5. The split liner 270 has a main liner sidewall 270a, and is provided with a split joint by means of a separate upper sliding or floating sidewall plate 270b. A backing or protection plate 274 also serves as one overlapping plate of the slip joint for retaining the upper sliding sidewall plate 270b, whereas an outer overlapping plate 275, projecting within the cavity 272 formed between the liner 270 and the inside wall 264 of the refractory vessel sidewalls 262, functions as another retaining plate for the slip joint. A wear plate 276 is positioned adjacent the fusion line 278, which extends between the molten bath within the vessel 260 and the batch material thereon supplied to the furnace 250.

The overlapping plates 274, 275 provide a vertical slip joint for the upper sliding or floating sidewall plate 270b with respect to the main liner sidewall 270a, while maintaining a leak proof seal to prevent cross flow of material into or out of cavity 272. Thus, the floating plate 270b permits the upper edge 271 to extend into colder upper regions of the batch while compensating for the difference in thermal expansion between the relatively cold upper edge 271 of the liner 270 and the relatively hot area of the liner around the fusion line 278, resulting in a large $\Delta t$. That is, the slip joint formed between the floating upper plate 270b and liner sidewall 270a by the overlapping plates 274, 275, forms a leak proof seal therebetween and alleviates thermal expansion problems normally associated with a continuous sidewall extending from the bottom of the furnace to an upper end which may project well into the batch above the fusion line 278. Although the floating plate 270b should alleviate the thermal expansion problem, design parameters would have to consider the possibility of down loading by the batch blanket and the binding or sintering of the floating plate within the overlapping joint, in order to have an effective floating plate liner.

Figure 6:
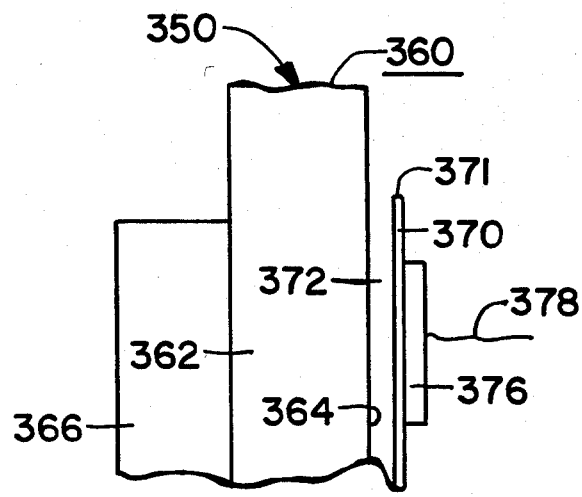

Another alternative to the problems encountered with the extended liner of FIG. 4 is to lower the upper extent of the liner as shown in the furnace 350 of FIG. 6. The furnace 350 includes a refractory vessel 360 having upstanding sidewalls 362 with an inner surface 364 and provided with outer insulation 366. The liner 370 is spaced from the surface 364 so as to provide a limited cavity 372 therebetween. The liner is shown having a wear plate 376 adjacent the fusion line 378 to protect the liner from the severe corrosion effects generated adjacent the fusion line. However, unlike the embodiment shown in FIG. 4, the upper end 371 of the liner 370 terminates within the batch material at a point which is relatively close to the fusion line, such that the $\Delta t$ experienced by the liner 370, between the molten bath adjacent the fusion line 378 and the upper end 371 thereof, is not greater than about 25% of the temperature experienced by the liner within the molten bath adjacent the fusion line. Accordingly, the thermal stresses generated by such temperature differential are not sufficient to cause cracking of the liner. Further, in order to inhibit corrosion of the refractory wall 362 above the liner, the insulation 366 is terminated adjacent the upper end of the liner so that cooling air from outside of the furnace may maintain that portion of the refractory wall 362 above the upper end of the liner at a cooler temperature than that portion covered by the insulation, and accordingly inhibit the corrosion of the surface 364 above the upper end of the liner 371.

Although the embodiments of FIGS. 4, 5 and 6 are not shown with the preferred use of a sealing plate, the fact that the liner of FIGS. 4 and 5 extends substantially into the batch material above the fusion line, the liner necessarily terminates in a cooler area of the furnace, and accordingly any glass resulting from batch material flowing behind the liner has a tendency to freeze in such area, and therefore the problems of refractory corrosion and contamination are virtually eliminated. That is, due to the cooler area, batch within the space behind the liner will not tend to melt and accordingly the refractory wall will not tend to corrode, since the inner surface of the refractory vessel will be relatively cool and the glass in such space will be stagnant. In a like manner, in the embodiment shown in FIG. 6, the fact that the insulation 366 is terminated adjacent the upper end 371 of the liner, creates a cooler zone in the refractory wall 362 above the liner, again causing a freezing of any melted batch in such area to thus inhibit refractory deterioration and contamination. Further, although the bottom area of the liners are not shown in FIGS. 2–8, it will be understood that the liners may be provided with any suitable bottom area such as suggested in the prior art including U.S. Pat. No. 4,366,571.

Figure 7:
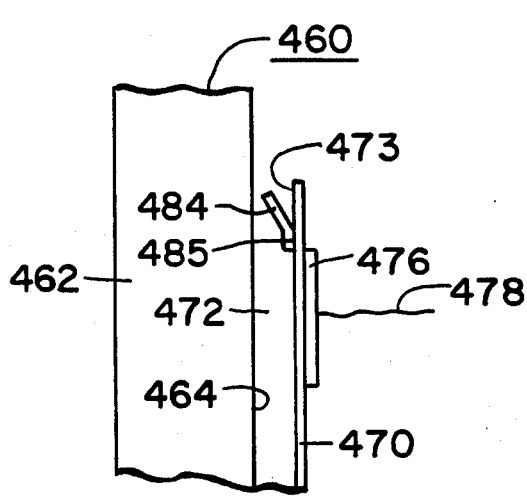
Figure 8:
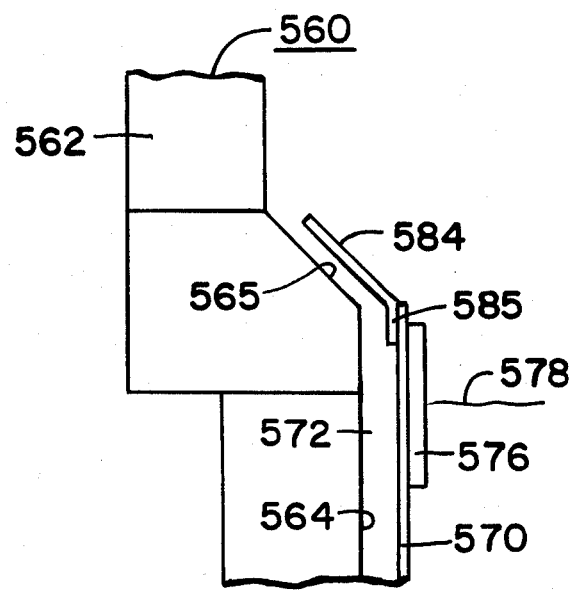

Alternate forms of sealing plates are shown in FIGS. 7 and 8. In FIG. 7 a refractory vessel 460, having upstanding sidewalls 462 with an inner surface 464, is shown having a protective liner 470 spaced apart from the sidewall to form a limited cavity or space 472. The liner 470 is provided with a wear plate 476 adjacent the fusion line 478, extending between the molten bath within the vessel 460 and the batch material thereabove. A sealing plate 484 is secured to the backside or outer surface 473 of the liner 470, by any suitable means such as bolts or the like to prevent fresh batch from flowing downwardly within the cavity 472 and to prevent the circulation of molten glass over the top of the liner, particularly during start-up periods. The plates 484 may be of various configurations including horizontal flanges, sloped flanges or even take the form of a refractory block. As shown, the sealing plate 484 may have a base portion 485 to facilitate attachment to the backside of the liner 473.

As shown in FIG. 8, the refractory vessel 560 may have upstanding sidewalls 562 which are stepped outwardly so that the inner surface 564 has an upwardly and outwardly tapered portion 565. A protective liner 570, having a wear plate 576 adjacent the fusion line 578, is provided with a conical rim 584 which forms a seal for a cavity 572 between the liner 570 and the walls 562. The cone shaped protection plate 584 is better able to withstand the differential expansion experienced by the liner 570, since it has a certain amount of flexibility that a cylindrical configuration does not have. An attachment portion 585 is utilized to attach the cone-shape protective plate 584 to the liner 570 by any suitable means such as bolts, rivets, welding or the like.

Whereas it has always been deemed necessary to terminate the upper extent of oxidizable refractory metal liners within melting furnaces below the surface of the molten bath contained therein in order to protect the liner, in situations where the batch materials being melted contain little or no carbonates, it is possible for such refractory metal liners to project upwardly into the batch blanket retained above the fusion line. Thus, whereas the prior art liner, which was terminated below the fusion line only protected that refractory immediately behind the liner, by projecting the present liner upwardly into the batch blanket, it is possible to also protect refractory above the liner from corrosion. Further, by utilizing a natural or "freezing" seal due to cooling and/or remoteness from the fusion line, or a mechanical seal adjacent the top of the liner, contamination of the molten material behind the liner due to fresh batch from within the melter is minimized and accordingly refractory corrosion is inhibited.

Although the now preferred embodiments of the invention have been set forth, it will be apparent to those skilled in the art that various changes and modifications may be made thereto without departing from the spirit and scope of the invention as defined in the appended claims.

We claim:

1. In combination with a melting furnace having a refractory vessel retaining a molten bath of material and a blanket of batch material thereon to be melted with a fusion line therebetween,
    a protective liner positioned within said refractory vessel and spaced from inner sidewalls thereof,
    said protective liner extending from adjacent the bottom of said refractory vessel through the fusion line between the molten material and the batch material and into the batch blanket above the fusion line,
    and means adjacent the upper end of said liner and above the fusion line for inhibiting the flow of batch material between the liner and said sidewalls.

2. A protective liner as defined in claim 1 wherein said means for inhibiting the flow of batch material between the liner and the sidewalls includes sealing plate means secured to an upper portion of said liner for substantially sealing off the upper extent of the space formed between said protective liner and the inner sidewalls of said refractory vessel, and for inhibiting the flow of batch material from the batch blanket into the space between the liner and the refractory vessel to thereby reduce corrosion of said sidewalls, and said sealing plate means extending between said liner and inner sidewalls of said refractory vessel within the batch blanket above the fusion line.

3. A protective liner as defined in claim 2 wherein said sealing plate means includes a plurality of outwardly-projecting sealing plates secured to upper end portions of said protective liner and cooperable with inner sidewalls portions of said refractory vessel to form an effective seal between the upper end of the liner and the vessel sidewalls, and adjacent ones of said plurality of sealing plates being spaced apart by means of divisions extending radially from a center of said liner to compensate for differential thermal expansion.

4. A protective liner as defined in claim 2 wherein said sealing plate means includes a plurality of L-shaped plates secured to an upper portion of said liner, bracket means for attaching said L-shaped plates to said liner, each of said L-shaped plates having an upright portion cooperable with inner wall portions of said refractory vessel to form a seal therewith, and said plates being mounted to the upper portion of said liner with spaces between adjacent plates to minimize thermal stresses in the liner assembly.

5. A protective liner as defined in claim 2 wherein said refractory vessel is provided about its outside walls with insulation up to a height equal to about the upper extent of said protective liner, and means permitting wall portions of said refractory vessel above such insulation to be subjected to cooling air externally of the vessel to thus reduce the temperature of the inside walls of said vessel above the protective liner to reduce corrosion affects on such wall portions.

6. A protective liner as defined in claim 2 wherein said sealing plate means includes a plate assembly secured to a back surface of said liner above the fusion line and adjacent an upper end portion of the liner, and said plate assembly projecting outwardly from the back of said liner toward an inner sidewall portion of said refractory vessel so as to effectively form a seal therewith and prevent the introduction of fresh batch material from the batch blanket into the space between the liner and the inner sidewalls of the refractory vessel.

7. A protective liner as defined in claim 2 wherein said sealing plate means includes a conical rim projecting upwardly and outwardly from an upper end portion of said liner, means securing said conical rim to said liner, and said refractory vessel being stepped outwardly so as to cooperably accommodate the outwardly projecting conical rim and effectively form a seal therebetween to inhibit the ingress of batch material from the batch blanket into the space between the liner and the sidewalls of said refractory vessel.

8. A protective liner as defined in claim 1 wherein said means adjacent the upper end of said liner for inhibiting the flow of batch material between the liner and said sidewalls includes a sealing layer of solidified batch material, which had been at least partially melted, positioned between an upper end portion of the liner and inner sidewalls of said refractory vessel above the fusion line level of the molten batch of material within the vessel, and said liner projecting upwardly above said fusion line and within said batch material a sufficient distance so that upper end portions thereof are relatively cool with respect to the temperature experienced by the liner adjacent the fusion line so as to maintain the solidified batch seal between the upper portion of the liner and the sidewalls of the refractory vessel.

9. A protective liner as defined in claim 8 wherein the upper end of said liner projects above the fusion line and into the batch material thereabove a distance such that the change in temperature experienced by the liner between the upper end and a portion in communication with the molten bath adjacent the fusion line does not substantially exceed 45% of the temperature experienced by the liner adjacent the fusion line.

10. A protective liner as defined in claim 8 wherein the liner is in the form of a split liner having an upper portion and a lower portion, and leak proof slip joint means connect said upper and lower portions.

11. A protective liner as defined in claim 8 wherein said liner includes a main liner portion terminating within the batch blanket above the fusion line, an upper sliding liner plate abutting and extending upwardly from the upper termination of said main liner portion, and a pair of overlapping plates secured to said main liner portion for slidably retaining said upper sliding liner plate.

12. A protective liner as defined in claim 1 wherein said means adjacent the upper end of said liner for inhibiting the flow of batch material between the liner and said sidewalls includes a sealing layer of solidified batch material, which had been at least partially melted, within the space between said liner and said sidewalls above the level of said fusion line within the vessel, and means for facilitating exterior cooling air flowing adjacent the exterior of the refractory vessel above the upper extent of said liner so as to cool the inner sidewalls of the vessel above the liner and the upper extent of the liner to maintain the solidified batch seal and reduce corrosion of the refractory sidewalls.

13. A protective liner as defined in claim 12 wherein said liner terminates within the batch material above the fusion line at a point such that the temperature difference between the temperature at the upper extent of said liner and the temperature of the liner in contact with the bath at a point adjacent the fusion line is not substantially greater than 25% of the temperature experienced by the liner at such point adjacent the fusion line, and said cooling means includes a termination of insulation adjacent an outer wall of said refractory vessel at a level substantially equal to and above the upper extent of said liner so that external cooling air may act upon the refractory vessel above the liner and cool the inner sidewall and upper extent of the liner.

14. A protective liner as defined in claim 1 wherein said liner is formed of an oxidizable refractory metal material and the batch forming said batch blanket contains relatively low amounts of materials which produce oxidizing gases upon melting.

15. A protective liner as defined in claim 1 wherein said liner is provided with wear plate means of the same material as said liner adjacent said fusion line for protecting said liner from the corrosive effects generated at the fusion line.

16. A furnace for melting thermoplastic material which comprises:
a refractory vessel having a bottom wall and upstanding sidewalls, a bath of molten thermoplastic material within said refractory vessel having a blanket of batch material to be melted thereon separated by a fusion line,
said upstanding sidewalls having inside and outside surface,
insulation surrounding portions of said outside surface,
protective liner means positioned within said refractory vessel adjacent to but spaced-apart from inside surface portions of said refractory vessel and extending from adjacent the bottom wall thereof through the fusion line to a level within the blanket of batch material retained above such fusion line,
said spaced-apart protective liner means forming a narrow space between an outer side of said liner means and inside surface portions of said upstanding sidewalls,
and means above said fusion line and adjacent an upper end portion of said protective liner means for effectively sealing the space between said liner means and said refractory vessel from the remainder of the refractory vessel and for thereby preventing contamination of material retained within such space and reducing corrosion of the refractory vessel walls.

17. A furnace for melting thermoplastic material as defined in claim 16 wherein said protective liner means is in the form of an oxidizable refractory metal liner, and said liner being terminated at its upper extent at a level such that the temperature differential between the temperature at the upper end of the liner and the temperature of the liner in communication with the molten bath adjacent the fusion line does not exceed 45% of said temperature of the liner adjacent the fusion line.

18. A furnace for melting thermoplastic material as defined in claim 16 wherein said means for sealing the space between said liner and said refractory vessel includes sealing plate means secured to said liner adjacent an upper portion thereof above said fusion line, and said sealing plate means being secured to said liner and cooperating with inside surface portions of said upstanding sidewalls of the refractory vessel for inhibiting the flow of batch material within the space between the liner and the refractory vessel so as to prevent contamination of the material therewithin and inhibit corrosion of the sidewalls of said refractory vessel.

19. A furnace for melting thermoplastic material as defined in claim 16 wherein said sealing means includes a layer of solidified batch material, which has been at least partially melted, within the space between the liner and the refractory vessel adjacent an upper portion of the liner for substantially sealing such space and inhibiting the flow of batch material therewithin so as to reduce the amount of corrosion to the refractory behind said liner.

20. A furnace for melting thermoplastic material as defined in claim 16 wherein said liner is provided with wear plate means of the same material as said liner adjacent the fusion line for protecting said liner from the corrosive effects generated at the fusion line.

21. An oxidizable refractory metal liner in combination with a glass melting furnace having a refractory vessel containing a bath of molten glass and a blanket of batch material thereon separated by a fusion line, said liner comprising upstanding sidewalls positioned within said refractory vessel in closely spaced-apart relationship with inner sidewall surfaces thereof, the sidewalls of said liner extending from adjacent a bottom of the refractory vessel through the fusion line and into the batch blanket thereabove, and sealing means formed at a level above the fusion line for inhibiting the flow of batch material between said liner and said refractory vessel to prevent corrosion of the sidewalls of said vessel behind said liner.

22. A refractory metal liner as defined in claim 21 wherein the said sealing means includes refractory metal sealing plate means secured to an upper end portion of said liner above said fusion line for forming a seal between the liner and wall portions of the refractory vessel so as to prevent the influx of batch material between the liner and the vessel.

23. A refractory metal liner as defined in claim 21 wherein said liner extends upwardly within said batch material a sufficient distance so as to facilitate the freezing of a layer of semi-molten batch material between the liner and the refractory vessel for forming a seal adjacent the upper end of said liner, and said liner being limited in its upper extent so as to accommodate thermal stresses generated therein due to the differential in temperature between the upper end and that portion in contact with the molten bath.

* * * * *